(12) United States Patent
Mehta et al.

(10) Patent No.: US 12,047,269 B2
(45) Date of Patent: Jul. 23, 2024

(54) END-TO-END FLOW VISIBILITY IN A DATA NETWORK INCLUDING SERVICE APPLIANCES

(71) Applicant: Cisco Technology, Inc., San Jose, CA (US)

(72) Inventors: Naoshad Mehta, San Jose, CA (US); Sundeep Singam Setty, Fremont, CA (US); Ateet Kumar Krishna Shetty, San Jose, CA (US); Shyam Nayan Kapadia, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/119,100

(22) Filed: Mar. 8, 2023

(65) Prior Publication Data
US 2023/0318958 A1 Oct. 5, 2023

Related U.S. Application Data (60) Provisional application No. 63/325,011, filed on Mar. 29, 2022.

(51) Int. Cl.
| | | |
|---|---|---|
| *G06F 15/16* | (2006.01) | |
| *G06F 9/54* | (2006.01) | |
| *H04L 29/06* | (2006.01) | |
| *H04L 43/04* | (2022.01) | |
| *H04L 43/50* | (2022.01) | |

(52) U.S. Cl.
CPC .............. *H04L 43/50* (2013.01); *H04L 43/04* (2013.01)

(58) Field of Classification Search
CPC ................................ H04L 43/50; H04L 43/04
USPC ........................................................... 709/224
See application file for complete search history.

(56) References Cited

U.S. PATENT DOCUMENTS

| | | | |
|---|---|---|---|
| 7,142,512 B1* | 11/2006 | Kobayashi | H04L 41/5019 370/428 |
| 8,842,578 B1* | 9/2014 | Zisapel | H04L 43/20 370/255 |
| 9,313,128 B2* | 4/2016 | Morimoto | H04L 43/20 |
| 9,577,898 B1* | 2/2017 | Baldi | H04L 43/062 |
| 10,623,424 B2* | 4/2020 | Holeman | H04L 67/568 |
| 10,652,281 B1* | 5/2020 | Moolenaar | H04L 63/0236 |
| 11,088,948 B1* | 8/2021 | Talur | H04L 63/0254 |
| 2009/0161544 A1* | 6/2009 | Kelly | H04L 43/026 370/232 |
| 2011/0145391 A1* | 6/2011 | Ivershen | H04L 63/0272 709/227 |
| 2013/0315248 A1* | 11/2013 | Morimoto | H04L 45/745 370/392 |
| 2015/0043351 A1* | 2/2015 | Ohkawa | H04L 47/28 370/236 |

(Continued)

*Primary Examiner* — Hamza N Algibhah
(74) *Attorney, Agent, or Firm* — Lee & Hayes, P.C.

(57) ABSTRACT

A system and method for providing end-to-end data flow analytics in a network flow that includes network appliances. Information regarding one or more network appliances is received by a flow collector and analyzed by an enrichment module. The network information regarding the one or more network appliances can be stored. Network flow data is received from various nodes within the network and stitched or aggregated in light of the enriched network appliance information to provide an end-to-end data flow that can be useful to understand one or more performance parameters of the unified network flow.

20 Claims, 8 Drawing Sheets

(56) References Cited

U.S. PATENT DOCUMENTS

| | | | |
|---|---|---|---|
| 2015/0281173 A1* | 10/2015 | Quinn | H04L 41/0894 |
| | | | 709/245 |
| 2016/0277272 A1* | 9/2016 | Peach | H04L 43/0858 |
| 2017/0118129 A1* | 4/2017 | Baldi | H04L 61/2571 |
| 2017/0171039 A1* | 6/2017 | Su | H04L 43/04 |
| 2019/0116082 A1* | 4/2019 | Rao | H04L 41/40 |
| 2019/0116111 A1 | 4/2019 | Izard et al. | |
| 2019/0123970 A1 | 4/2019 | Rastogi et al. | |
| 2019/0182266 A1* | 6/2019 | Doron | H04L 63/145 |
| 2019/0238663 A1* | 8/2019 | A | H04L 69/163 |
| 2020/0106741 A1 | 4/2020 | Fandli | |
| 2021/0218618 A1 | 7/2021 | Rao | |
| 2022/0021574 A1 | 1/2022 | Siddiqi et al. | |
| 2022/0045971 A1* | 2/2022 | Lu | H04L 47/31 |
| 2022/0109685 A1* | 4/2022 | Hankins | H04L 63/0227 |
| 2023/0115935 A1* | 4/2023 | Wahbo | G06N 20/00 |
| | | | 726/23 |
| 2023/0250620 A1* | 8/2023 | Appler | A47B 96/18 |
| | | | 312/228 |
| 2023/0253452 A1* | 8/2023 | Gardner | H01L 29/778 |
| | | | 267/288 |

* cited by examiner

END-TO-END FLOW VISIBILITY IN A DATA NETWORK INCLUDING SERVICE APPLIANCES

RELATED APPLICATIONS

This application claims priority to U.S. Provisional Patent Application No. 63/325,011 Filed Mar. 29, 2022, the entire contents of which are incorporated herein by reference.

TECHNICAL FIELD

The present disclosure relates generally to providing end-to-end flow visibility in a network that includes network appliances within the flow path.

BACKGROUND

Computer networks such as Large Area. Networks (LAN), Virtual Large Area Networks (FLAN) and Ethernet Private Networks (EVPN) have been gaining increasing importance in modern computing environments. As the importance and complexity of such networks grows so also does the need to understand and monitor the performance of such networks in a real-time, useful manner. It is important for network managers to understand network performance parameters such a latency, network anomalies, network path failures and data packet rate among others and to also be able to keep a record of such performance parameters.

Analytics tools can provide insight into network performance by analyzing the flow of data through the network and providing useful user readable data analytics regarding various network performance parameters. Data center networks have evolved from 3-tier access-core deployments to spine-leaf based routed fabrics to Virtually Extensible Large Area Network (VXLAN) Ethernet Virtually Extensible Large Area Network (EVPN) based deployments. With overlays, there can be a dynamic tunnel that is created for with an appropriate inner header representing the actual payload and an outer header representing the source and destination location for traffic forwarding. In some situations, east-west and north-south traffic within and across data centers may traverse service appliances such as firewalls, load balancers, etc. Visibility and troubleshooting are important in such environments, especially in the age of hybrid cloud networking.

Certain network analytics tools can provide flow visibility that leverages the hardware telemetry export functionality present on some current network devices based on the cloud scale hardware (e.g., Application Specific Integrated Circuit (ASIC)). Flow visibility can be provided for various other flow metrics such as error counters, drop reasons, hop-by-hop latency, etc. that are important for troubleshooting and identifying reasons for degraded network performance.

One challenge to such data flow analysis is that when flows traverse a device such as a service appliance, a single data flow is represented as multiple separate flows. This can occur because a flow starts from an ingress leaf, traverses the network fabric, then reaches the service leaf and egresses out of that leaf toward the service appliance. The service appliance is not part of the network fabric and hence is treated as a termination point for the flow. How-ever, after applying the appropriate policy on the service appliance, the packet then re-enters the network fabric into the service leaf. Then it traverses the fabric to the egress leaf where the destination is attached. This flow from the service appliance to the destination is treated as a separate flow. What is required from an end user perspective is to view one unified flow from the source to the destination Where the service appliance should just be considered as an intermediate hop. In addition, the service appliance in certain scenarios may perform Network Address Translation (NAT) to data packets as they pass through that appliance. This can make it even more challenging to recognize the entire path of the flow from the source to the destination as it traverses through the service appliance.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

This disclosure describes techniques for providing end-to-end data flow information in a network that includes one or more network appliances. Information regarding one or more network appliances in a computer network is received. The information can be stored in a database for later retrieval and can include, for example, a type of network appliance, such as whether the appliance is a firewall, load balancer or some other type of service appliance. There could be more than one network appliance present in the path from the source to the destination, typically referred to as a service chain. The information can also include a make or model of the network appliance and may include connectivity information, such as where the appliance is located in the network.

Additionally, the techniques described in this disclosure may be performed as a method and/or by a system having non-transitory computer-readable media storing computer-executable instructions that, when executed by one or more processors, performs the techniques described above.

Example Embodiments

Flow visibility in computer networks, including data center networks, has been an area of great interest for years. There is a strong need for network managers and controllers to understand data network performance in real time. There is a need for access to user consumable data metrics that can provide network flow information such as, but not limited to, latency, data packet count, network flow anomalies, etc.

Data center network flow tools can provide extremely useful information for managing a computer network such as a data center network. Such tools can provide real-time monitoring and analytics services. For example, network analytics tools can monitor a data center network and pinpoint issues that can be addressed to maintain availability and reduce surprise outages. Providing such an understanding of a network can provide proactive advice with a focus on maintaining availability and alerting customers about potential issues that can impact network up-time.

Data analytics tools can provide useful log collection functionalities and can provide a way for customers to collect tech support across multiple devices and upload that tech support to a service engine. Such analytics tools can provide immediate access to site groups, with advisories, anomalies, alerts, timeline, and top nodes by anomaly score, and topology view.

Analytics tools can provide information regarding anomalies including anomalies raised for resource utilization, environmental issues, interface and routing protocol issues, flows, endpoints, events, assurance analysis for sites and uploaded files as well as compliance, change analysis and static analysis.

In some cases, data analytics tools can provide a dashboard which can display detected alerts and anomalies associated with various network nodes. It can also display recommended advisories for nodes in a selected site. Each node in a site can stream telemetry data and events to service of the tooling which can then analyze the data and detect anomalies. The dashboard can provide relevant information to view. In some cases, a user can view relevant information and select specific items to view in detail. The tooling can provide immediate access to advisories and anomalies occurring in the network.

The advisories on the dashboard can display various levels of advisory severity for switch hardware and software in the network. I can categorize by severity and identify software versions and hardware platforms to which the advisories apply. Advisories can be delivered based on the detection of relevant field notices, software bugs, hardware issues, and hardening violations. The tooling can consider such information and provide recommendations such as software or hardware upgrades to address bugs and other anomalies.

A tooling dashboard can provide immediate access to anomalies occurring in the network. Anomalies can be learned deviations from a last known good state of a switch. The anomalies can be displayed by type and severity. Anomalies can include resource utilization, environmental issues, and interface-level errors. In some anomalies can be coded based on severity.

In addition, network flow tooling can display network topology information. The topology display can show interconnection of nodes in the network fabric. For example, a page can display a list of nodes, node types, interface names, Link Layer Discovery Protocol (LLDP) information from a leaf node to another leaf node, Internet Protocol Network (IPN) information, and anomaly score on the link. This can, for example, allow a suer to distinguish between a spine node, leaf node, and boarder leaf node with different indicators and interface names.

Internet Protocol Links (IPN) are spine node links connected to the IPN and are distinguished from the links connected to the internal leaf nodes. The IPN is shown as a physical entity in the topology. In some cases, network flow tooling can allow a user to toggle spine nodes, leaf nodes and controllers to add or remove nodes from the topology view. In addition, a user can toggle each anomaly score to add or remove one or more anomaly scores from the topology view.

Data center networks have evolved from 3-tier access-aggregation-core deployments to spine-leaf based routed network fabrics to Virtually Extensible Large Area Networks (VXLAN) or Ethernet Virtual Private Network (EVPN) based deployments. With overlays, there can be a dynamic tunnel created for Top of Rack (ToR) to Top of Rack (ToR) traffic with an appropriate inner header representing the actual payload and the outer header representing the source and destination ToR location for traffic forwarding. East-west and north-south traffic within and across networks may traverse service appliances like firewalls, load balancers, etc. Visibility and troubleshooting become difficult in such environments, especially in the age of hybrid cloud networking.

A system and process described herein can provide real-world data flow visibility and consumer usable network flow metrics by leveraging the hardware telemetry export functionality present on certain new generation switches and routers based on cloud scale Application Specific Integrated Circuits (ASICS) that can provide high speed forwarding as data packets pass through a network forwarding plane. Such next generation switches in a data center can be configured to export flow records to a central ingest engine that can stitch/aggregate the various flow records, correlate that with software exported tables and provide a powerful end-to-end flow path for every network flow. In addition, visibility is provided for various other flow metrics such as error counters, drop reasons, hop-by-hop latency that are very crucial for troubleshooting and identifying reasons for degraded network performance. This solution can work consistently for both Application Centric Infrastructure (ACI) and NX-OS® based data network deployments.

Network flow data is collected. The network flow data can include network flow data from one or more network devices and may include flow telemetry data packets. The network flow data is analyzed using the stored network appliance information to determine that the network flow is a continuous flow that appears as multiple segmented flows passing through a network appliance. The network flow data is aggregated to provide an end-to-end network flow information.

In one embodiment, the network flow data can be enriched to provide user consumable flow metrics such as, but not limited to, data packet count, data flow anomalies and latency. The enriched aggregated network flow data can be stored in a database for later access and use by a consumer or network manager. In one embodiment, the network flow data can be received from one or more network switches or routers. The network flow data from one or more switches or routers can be aggregated with information from one or more network appliances.

In one embodiment, at least one or more of the network appliances can perform Network Address Translation (NAT)

and the flow data can be analyzed in view of the information regarding the one or more network appliances to stitch together and aggregate the network flow data.

One challenge to providing useful end-to-end network flow metrics is that when data flows traverse a device such as a service appliance what is actually a single continuous flow appears as two separate flows. This is because a flow starts from an ingress leaf/ToR, traverses the network fabric, then reaches the service leaf and egresses out of that leaf toward the service appliance. However, after applying the appropriate policy on the service appliance, the packet then re-enters the network fabric into the service leaf. Then it traverses the fabric to the egress leaf where the destination is attached. This flow from the service appliance to the destination is treated as a separate flow. What is required from an end user perspective is to view one unified flow from the source to the destination where the service appliance should just be considered as an intermediate hop. In addition, in certain circumstances, the network appliance may perform Network Address Translation (NAT), such as Source Network Address Translation (SNAT) or Destination Network Address Translation (DNAT), making it even more challenging to recognize the multiple flows as a single flow.

Network appliances can include devices such as firewalls and load balancers. A firewall is a network security device that monitors incoming and outgoing network traffic and decides whether to allow or block specific traffic based on a defined set of security rules. Firewalls have been a first line of defense in network security for many years. They establish a barrier between secured and controlled internal networks that can be trusted and untrusted outside networks such as the internet. A Firewall can be hardware, software, Software as a Service (SaaS), public cloud, or private cloud (virtual).

A proxy firewall is an early type of firewall that serves as a gateway from one network to another for a specific application. Proxy servers can provide additional functionality such as content caching and security by preventing direct connections from outside the network. However, such proxy firewalls may also impact throughput capabilities and the applications that they can support.

Now considered a traditional firewall, a state inspection firewall allows of blocks traffic based on state, port, and protocol. It monitors all activity from the opening of a connection until it is closed. Filtering decisions are made based on both administrator-defined rules as well as context, which refers to using information from previous connections and packets belonging to the same connection.

A Unified Threat Management (UTM) firewall can combine, in a loosely coupled way, the functions of a stateful inspection firewall with intrusion prevention and antivirus. It may also include additional services and may also include cloud management. TUM firewalls focus on simplicity and ease of use.

Another type of firewall is a firewall that has been referred to as a Next-Generation Fire Wall (NGFW). Firewalls have evolved beyond simple packet filtering and stateful inspection. Many companies are deploying NGFW to block modern threats such as advanced malware and application-layer attacks. A NGFW can include: Intelligence-based access control with stateful inspection; integrated intrusion prevention system (IPM); application awareness and control to see and block risky applications; upgrade paths to include future information feeds; techniques to address evolving security threats; and URL filtering based on geolocation and reputation. While these capabilities are increasingly becoming a standard for many companies, NGFWs can do more.

Another type of firewall is a threat-focused NGFW. These firewalls include all the capabilities of a traditional NGFW while also providing advanced threat detection and remediation. With a threat-focused NGFW a user can: know which assets are most at risk with complete context awareness; quickly react to attacks with intelligent security automation that sets policies and hardens defenses dynamically; better detect evasive or suspicious activity with network and endpoint event correlation; greatly decrease the time from detection to cleanup with retrospective security that continuously monitors for suspicious activity and behavior even after initial inspection; provide ease of administration and reduced complexity with unified policies that protect across the entire attach continuum.

A load balancer is a device that can efficiently distribute incoming network traffic across a group of back-end servers, also known as a server farm or server pool. Modern high-traffic websites must serve hundreds of thousands, if not millions, of concurrent requests from users or clients and return the correct text, images, video, or application data, all in a fast and reliable manner. To cost-effectively scale to meet these high volumes, modern computing best practice generally requires adding more servers.

A load balancer acts as a "traffic cop", sitting in front of a server and routing client requests across all servers capable of fulfilling those requests in a manner that maximizes speed and capacity utilization and ensures that no one server is overworked, which could degrade performance. If a single server goes down, the load balancer automatically starts to send requests to it. In this manner the load balancer can perform several functions: distributing client request or network load efficiently across multiple servers; ensuring high availability and reliability by sending requests only to servers that are online; and providing the flexibility to add or subtract servers as demand dictates.

Different load balancing algorithms are available to provide different benefits. The choice of load balancing method depends on a user's needs. Using a "round-robin" load balancing algorithm, requests are distributed across the group of servers sequentially. A "Least Connections" algorithm is another algorithm wherein a new request is sent to the server with the fewest current connections to the clients. The relative computing capacity of each server is factored into determining which one has the least connections. A "Least Time" algorithm sends requests to the server selected by a formula that combines the fastest response time and fewest active connections. A "hash" algorithm distributes requests based on a user defined key, such as a client IP address or the request URL. An "IP Hash" algorithm is a load balancing algorithm wherein the IP address of the client is used to determine which server receives the request. A "Random with Two Choices" algorithm picks two servers at random and sends the request to the one that is selected by then applying the "Least Connections" algorithm.

As described in detail herein below, in order to provide granular flow visibility as flow traffic traverses service appliances, a flow aggregation pipeline or central ingest engine has been enhanced with information that is obtained from the network controllers as well as the network flow information that is streamed out from the service appliances themselves. When service appliances are attached to the network fabric, the controller can have a service onboarding workflow. As part of the workflow, information is provided about the physical attachment of the service appliance to the switch or router (which can be referred to as a leaf). Service appliance onboarding is typically done one time per appliance. The appliance itself may be of a virtual or physical form factor. Once the appliance is onboarded, depending on the appliance type (firewall, load-balancer, etc.), there may be certain guided workflows in the controller that will allow users to configure the network fabric with the appropriate configuration related to service appliance peering, service redirect policies, etc. In some cases, the service appliance itself can also be configured along with the service leaf to complete both sides of the configuration. Network Address Translation policies may also be part of the input user intent. This workflow itself is re-entrant and can be repeated for various tenant Virtual Routing and Forwarding (VRFs) over the network as required along with the ability to edit, add and/or delete service redirection policies. The same configuration workflow also can be extended to support service graphs comprising multiple service appliances.

In a situation where a network appliance does not apply Network Address Translation (NAT), such as with an East-West firewall or a tenant-edge firewall, information about the firewall physical attachment points can be streamed out from the controller to the central ingest engine. This can include information about route peering and service policies configured by the user. This information along with software telemetry and Flow Telemetry (FT) streamed out from the switches or routers can then be used in the flow stitching aggregation pipeline to allow FT records from the ingress leaf, service leaf, and egress leaf to be stitched together to provide a single unified detailed end-to-end flow.

When a network appliance does perform Network Address Translation (NAT), service appliance streams of network flow records can include NAT mapping at a per flow level. This information along with a generated enriched cache can be used in a flow aggregation service as will be described below.

A system and method according to embodiments described herein below can monitor a data center or other computer network and pinpoint issues that can be addressed to maintain availability and reduce surprise outages. Providing an understanding of the computer network allows for proactive advice with a focus on maintaining availability and alerting a network manager of potential issues that can impact network performance.

The system and method can provide a useful log collection of functionalities. It can provide a way for network managers to collect tech support across multiple devices. Flow telemetry allows a user to see the path taken by different flows in detail. It also allows a user to identify the End Point Group (EPG) and Virtual Routing and Forwarding (VRF) of the source and destination. The user can see the switches in the flow with the help of flow table exports from the nodes of the network. The flow path is generated by stitching together all of the exported data in the order of the flow.

Figure 1:
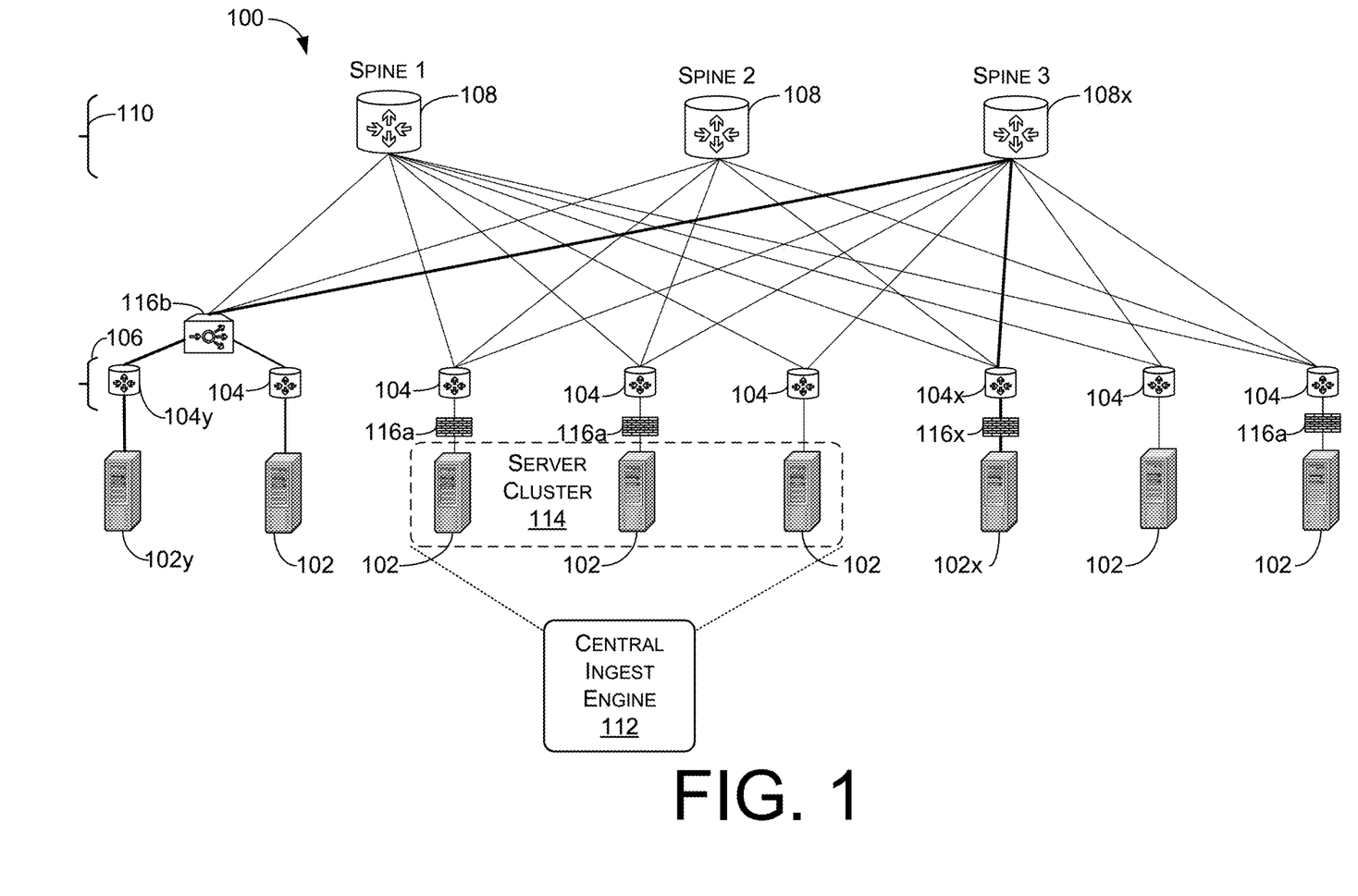
FIG. 1 illustrates a schematic view of a network architecture including a central ingest engine for analyzing data flow.

FIG. 1 illustrates a schematic of an exemplary computer network 100. In one embodiment, the computer network 100 can be configured as a leaf and spine computer network architecture. In this case, the architecture of the computer network 100 can include a plurality of user computer devices 102. In one embodiment, the one or more of the user devices 102 can be computer servers, however, in other embodiments, the user devices 102 can be other computer devices, such as but not limited to personal computers, laptop computers, Internet of Things (IoS) devices, etc. The user devices 102 can be connected with various routers or switches 104. The routers or switches 104, which can be referred to generally as "nodes" of the network can, in one embodiment, make up leaves 106 of the network 100. The nodes 104 can be connected with routers or switches 108, which can make up a "spine" 110 of the network 100. In one embodiment, the routers or switches 108 can be configured to route data at a higher data rate and higher bandwidth than the routers or switches 102 of the leaf layer 106.

A central ingest engine 112 can be connected with or in communication with the network 100. In one embodiment, the central ingest engine 112 can be connected with or in communication with one or more of the user devices or servers 102. In one embodiment, the central ingest engine 112 can be connected with or in communication with a server cluster 114, which can include a plurality of computer servers 102. The central ingest engine 112, which will be described in greater detail herein below can be configured to analyze, enrich and aggregate network flow data from the network 100 to provide useful, user consumable network flow metrics such as, but not limited to data packet count, latency and/or data flow anomalies.

In addition to the routers or switches 104 of the leaf layer 106, and routers or switches 108 of the spine layer 110, the network 100 can include various network appliances 116. Such network appliances can include one or more firewalls 116a, or one or more load balancers 116b. Other different types of network appliances may be included in the fabric of the network 100 as well such as, but not limited to, intrusion detection systems, TCP optimizers, etc. In many cases, the presence of such network appliances 116 can make an end-to-end data flow appear as multiple segmented flows. For example, in one embodiment data may flow from server 102(x), through firewall 116x, to leaf router 104x to spine router 108x, then to load balancer 116b through leaf router 104y to server 102y. The presence of the various appliances can make the data path appear as several separate paths. For example, from Server 102(x) to firewall 116(x) could appear as first path. From firewall 116x to load balancer 116b could appear as a second path, and the path from the load balancer 116b to the server 102y could appear as a third path segment. The central ingest engine 112, however, can be configured to recognize the presence of the network appliances 116, and can stitch together and aggregate the network flow data to include a complete end to end network analysis of consumer usable network flow analytics.

Figure 2:
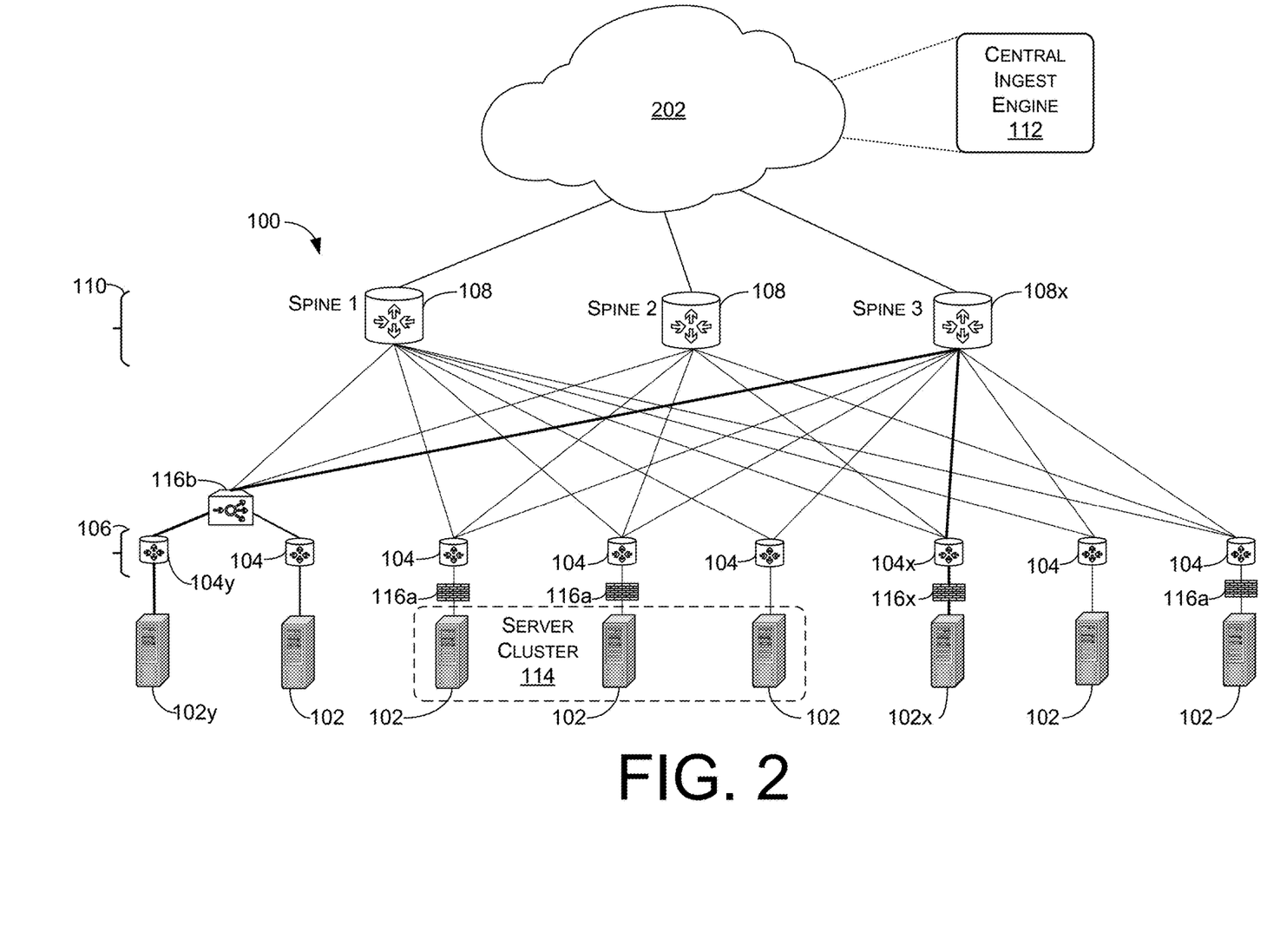
FIG. 2 illustrates a schematic view of a network architecture including a central ingest engine for analyzing data flow according to an alternate embodiment.

FIG. 2 illustrates a computer network architecture 200 according to another embodiment. In one embodiment, the network 200 can include a series of switches or routers 104 that can define a leaf network layer 106 and can further include a series of switches or routers 108 defining a spine network layer 110. As shown in FIG. 2, the routers 104, 108 of the network 200 can be connected with a remote or cloud based network 202. In some embodiments, this network architecture 200 can be referred to as a Virtually Extensible Large Area Network (VLAN). The cloud-based network 202 can provide flexibility in adding or changing the capacity and performance of the network 200 as network demands change. In one embodiment, the central ingest engine 112 can be in connected with or in communication with the cloud-based network system 202. As previously described, the central ingest engine 112 can receive network flow information and can enrich and aggregate the network flow data to provide valuable, consumer usable information regarding network performance and data flow.

Also, as previously described, the central ingest engine 112 can receive and store information regarding one or more appliances 116 such as such as firewalls 116a, load balancers 116b or other network appliances. Whereas the various routers or switches 104, 108 can be configured to provide network flow data to the central ingest engine 112, the various network appliances can cause a network flow to appear as separate disjointed network flows as described above with reference to FIG. 1. For example, as described above, a network flow from server 102x, through firewall 116x, leaf router 104x, spine router 108x, load balancer 116b, leaf router 104y to server 102y could appear as several disjointed flows. The central ingest engine 112 can be configured to recognize the presence of the various network appliances 116 and stitch and aggregate the network flow information to provide end-to-end network path data and information. This stitching and aggregation will be described in greater detail herein below.

Figure 3:
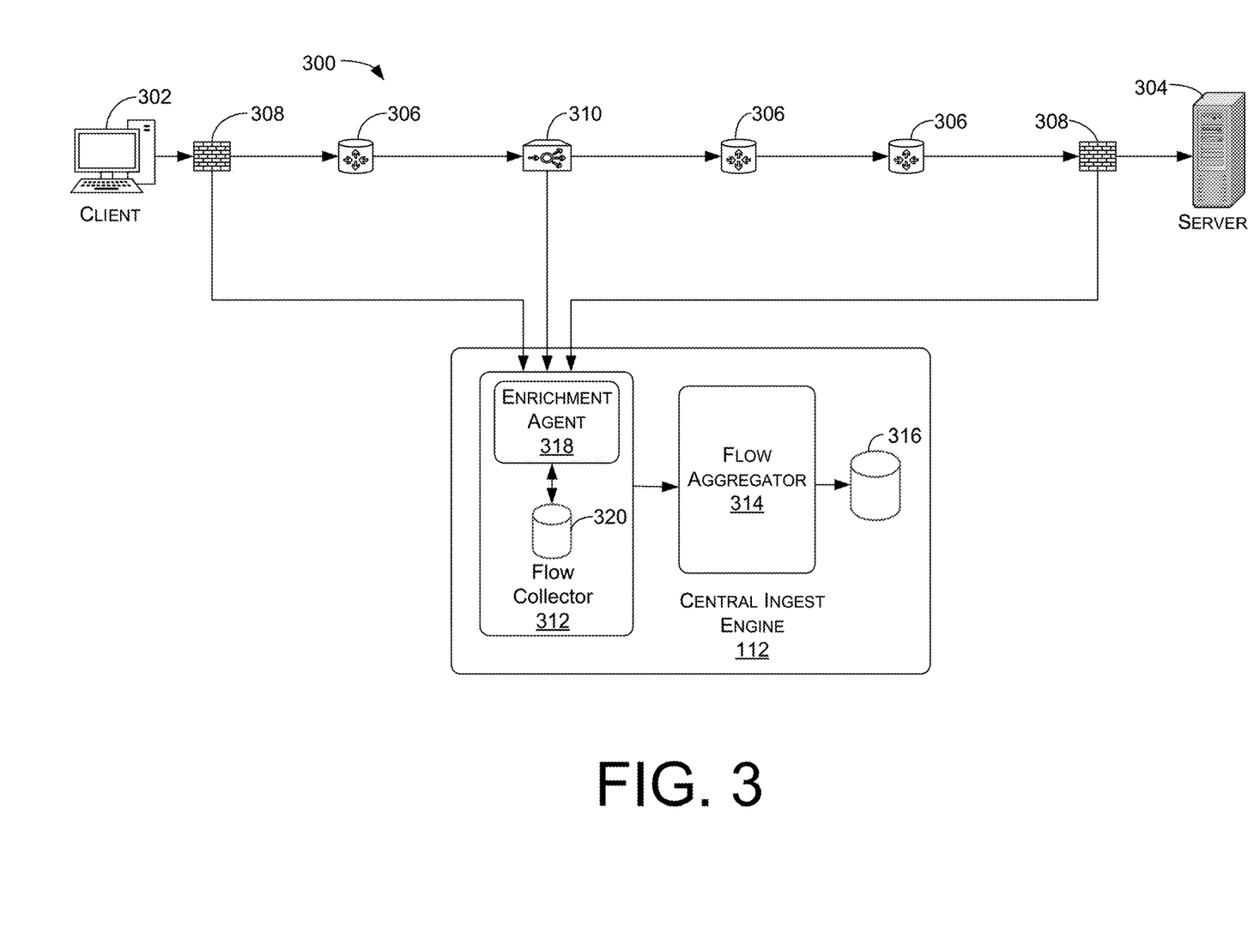
FIG. 3 illustrates a schematic view of a central ingest engine receiving network appliance information from network appliances of a network path.

FIG. 3 shows a schematic of a network path 300 that can be a part of a larger network such as the network 100 of FIG. 1, or network 200 of FIG. 2. In one embodiment network path 300 can be a network route from a client device 302 to a server or computer server 304. As shown in FIG. 3, the network path 300 can include multiple switches or routers 306. In addition, the network path can include one or more network appliances. For example, the network path 300 can include one or more firewalls 308, and one or more load balancers 310. The previously described central ingest engine 112, can be connected with or in communication with the network path 300 as well as to the rest of a related computer network (e.g. 100 of FIG. 1 or 200 of FIG. 2).

In one embodiment, the central ingest engine 112 can include a flow collector 312, a flow aggregator module 314 and an aggregated flow database 316, all of which will be described in greater detail herein below. In one embodiment, the flow collector 312 can include an enrichment agent 318, and an appliance information database 320. Information regarding each of the network appliance devices 308, 310 is sent or communicated to the flow collector 312. This information can be processed by the enrichment agent 318 and stored in the appliance information database 320 for future retrieval and use. In one embodiment, the service appliance information can be loaded into the database 320 when service appliance 308, 310 is first installed into the network. The service appliance 308, 310 may be of a virtual or physical form factor. Once the appliance 308, 310 is onboarded (e.g. connected to the network), depending upon the appliance type (e.g. firewall, load-balancer, etc.), there may be certain guided workflows in a network controller that can allow users to configure the network fabric with an appropriate configuration related to service appliance peering, service redirect policies, etc. In some cases, the service appliance itself may also be configured along with the service leaf to complete both sides of the configuration. Network Address Translation (NAT) policies may also be part of the input user intent. This workflow itself can be re-entrant and can be repeated for various tenant Virtual Routing and Forwarding (VRF) and or networks as required along with an ability to edit/add/delete service redirection policies. The same configuration can also be extended to support service graphs comprising multiple service appliances.

Figure 4:
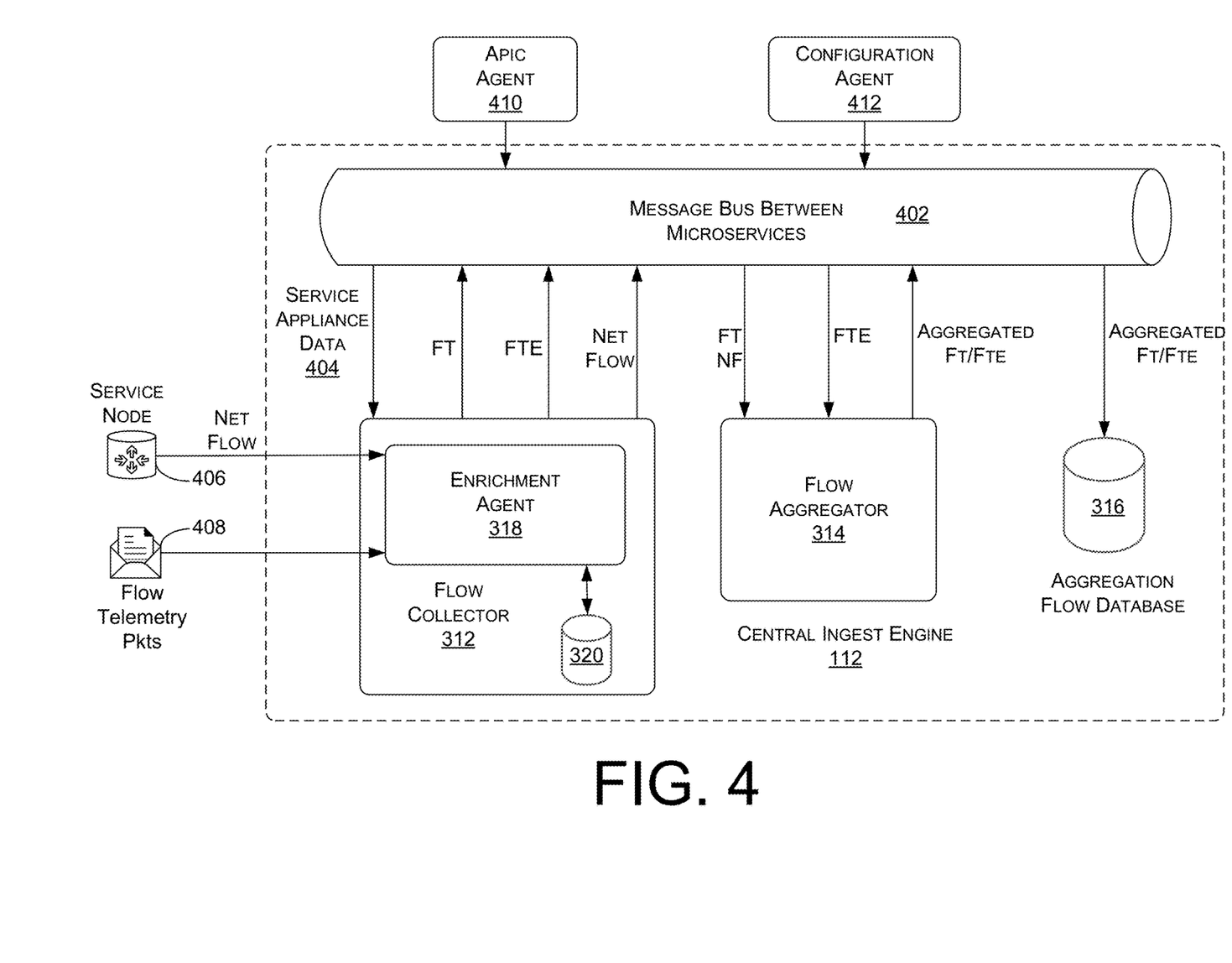
FIG. 4 illustrates a schematic illustration of a central ingest engine performing enrichment and aggregation of network data flow.

FIG. 4 illustrates a schematic of the central ingest engine 112 enlarged and in greater detail in order to more fully describe its functionality and components. As described previously, the central ingest engine 112 includes a flow collector module 312, a flow aggregator 314 and an aggregation database 316. The flow collector 312, can also include an enrichment agent 318 and a network appliance information database 320. In addition, in one embodiment, the central ingest engine may also include a message bus 402 to exchange data between various microservices (e.g. 312, 314, 316) of the central ingest engine 112.

As discussed above, the flow collector 312 can receive service appliance data 404. The service appliance data can include information regarding the type of appliance as well as its location within the network (e.g. network 100 or 200). This service appliance data 404 can be entered into the flow collector 312 when each service appliance is connected to the network. The service appliance data 404 can be stored in the service appliance database 320 for later retrieval by the enrichment agent 318.

The enrichment agent 318 receives network flow data from one or more service nodes 406. In one embodiment the service node or nodes can be nodes such as routers or switches 104, 108 or service appliances 116 of a network such as network 100 of FIG. 1 or network 200 of FIG. 2. In addition, the enrichment agent can receive flow telemetry packets 408, which in one embodiment can also be received from one or more nodes of a network such as network 100 of FIG. 1 or 200 of FIG. 2.

The enrichment agent 318 includes logic and/or circuitry that can process and enrich the received network flow data from the service nodes and flow telemetry packets 408 and convert the data into consumer usable information that can be useful in analyzing network performance. In addition, the enrichment agent 318 can retrieve the network appliance information from the database 320. The enrichment agent includes logic and/or circuitry capable of recognizing whether the network flow data include network flow that traverses one or more appliances. The enrichment agent 318 then stitches together what would appear to be multiple data flows into a single end-to-end data flow and enriches this data to provide end-to-end consumer usable information that can be utilized by a user for determining network performance for a particular network path or paths. Such usable information can include latency information, data packet count, anomalies as well as other useful information.

In some instances, one or more network appliances can perform Network Address Translation (NAT). This can be performed, for example, by a firewall to provide added security to user devices of a network. Such Network Address Translation can further increase the difficulty of recognizing that a network flow traversing such a network appliance is actually a continuous flow. However, the service appliance information stored in the database 320 can include information regarding such NAT. This NAT information can be used by the enrichment agent 318 to stitch together the flows into an end-to-end flow for analysis and enrichment purposes.

The flow collector 312 can then send the enriched information to the message bus 402 where it can be delivered to the flow aggregator 314. The enriched flow information can include enriched Flow Telemetry (FT), Flow Telemetry Event (FTE) data, and Network Flow (NF) data. In one embodiment, the FTE packets are exported only when configured events occur, whereas FT packets can be streamed continuously. In one embodiment, FTEs can be captured for all data traffic, whereas FT can be captured for filtered traffic. The flow aggregator receives the enriched Flow Telemetry (FT) data, FTE and Network Flow (NF) data. Multiple data flows can be batched and aggregated over a predetermined time frame to provide aggregated consumer usable network flow information. For example, the network flow information can be batched over a period of, for example, 60 seconds. In one embodiment, the aggregator can aggregate multiple network flows by performing sum, average and standard deviation calculations for multiple flows to provide accurate consumer usable flow information.

The aggregated and enriched network flow data FT and FTE can be sent to the aggregation flow database 316 via the message bus 402 where it can be stored and later retrieved to provide, accurate useful, user consumable network flow information regarding network flow in the network. The aggregated flow database 316 can store this information in hardware or software.

In a situation where Network Address Translation (NAT) is not present, contract information such as source class or destination class, Virtual Network Identifier (VNI) or Virtual Routing and Forwarding (VRF) can be used as context to correlate and aggregate flows across the segments (inside and/or outside of the network) to provide end-to-end flow metrics visibility. Service node attachment details available in an enrichment case can be used to stitch flow paths across appliances and to provide packet count, anomalies and latency experienced by each segment.

In a situation where Network Address Translation (NAT) is performed by an appliance in the network flow, the service appliance streams network flow (NF) at a given cadence (such as for example 30 to 60 seconds) which consists of NAT mapping at a per flow level. Network translation address mapping can be used to stitch together multiple flow segments into a continuous flow. This information, along with the above-described enrichment cache can be used in the flow aggregation performed by the flow aggregator 314. The five-tuple segment is correlated with the post NAT network flow provided mappings and then written to and stored by the aggregation flow database. This thereby provides a cohesive solution for providing accurate, useful, user consumable network flow visibility for network flow across one or more service appliance.

A Network Controller such as the Cisco Application Policy Infrastructure Controller (APIC) 410 can be in communication with the message bus 402. While this figure uses APIC as an example network controller, the same methodology applies to other network controllers such as the Cisco Data Center Network Manager (DCNM) or the Cisco Nexus Dashboard Fabric Controller (NDFC). The APIC 410 can serve as a point of automation and fabric element management in both physical and virtual network environments. The APIC 410 can provide centralized analytics and visibility of network health as it relates to applications. This can be performed by providing application and tenant health at a system level by using real-time metrics, latency details, and resource consumption statistics.

In addition, a Configuration Agent 412 can be in communication with the message bus 402. The Configuration Agent 412 can be employed in the initial configuration and subsequent partial configurations of network devices. When a network device is first employed in a computer network it connects to the configuration agent by establishing a TCP connection through the use of Computer and Network Systems (CNS) configuration initial command, a standard Command Line Interface (CLI) command. The device issues a request and identifies itself by providing a unique configuration identification to the configuration agent. When a networking services web server receives a request for a configuration file, it invokes a Java® servlet and executes the corresponding embedded code. The embedded code directs the Networking services web server to access the directory server and file system to read the configuration reference for the device (configuration ID) and template. The configuration agent 412 prepares an instantiated configuration file by substituting all of the parameter values specified in the template with valid values for the device.

The configuration server forwards the configuration file to the networking services web server for transmission to the routing device.

Figure 5:
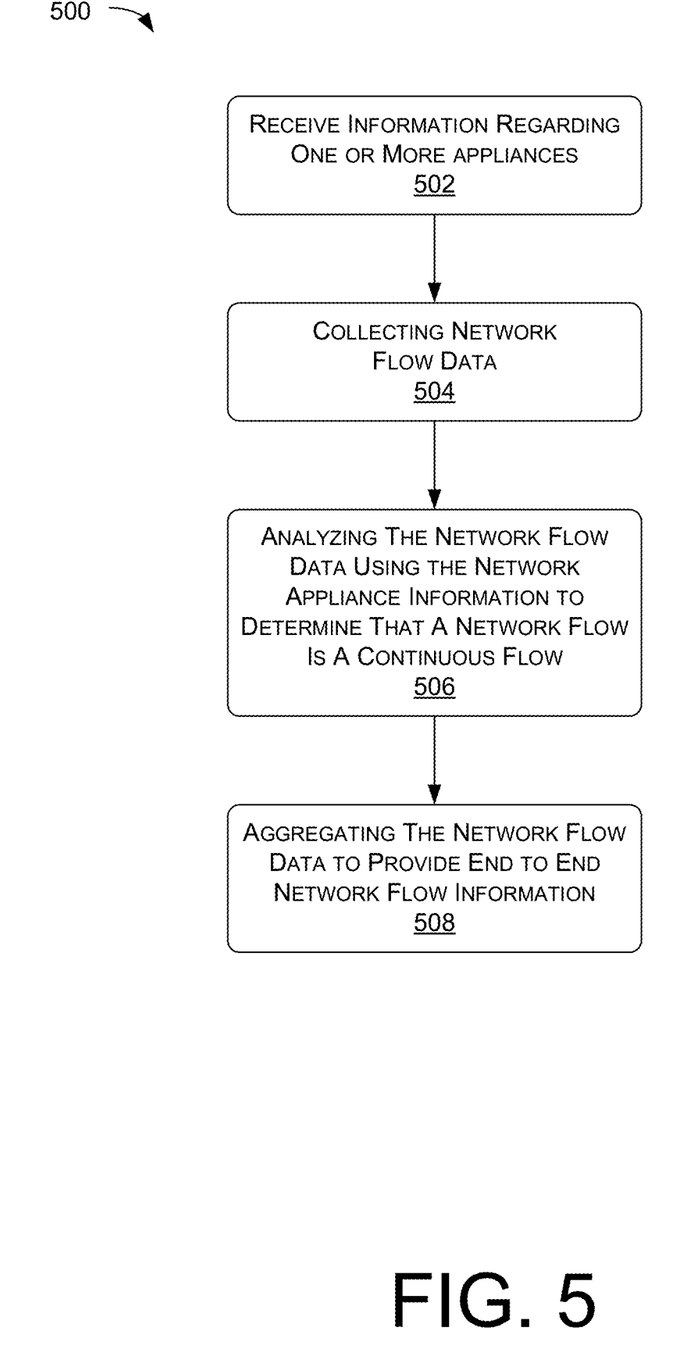
FIG. 5 illustrates a flow diagram of an example method for providing end-to-end network flow metrics in a data network.
Figure 6:
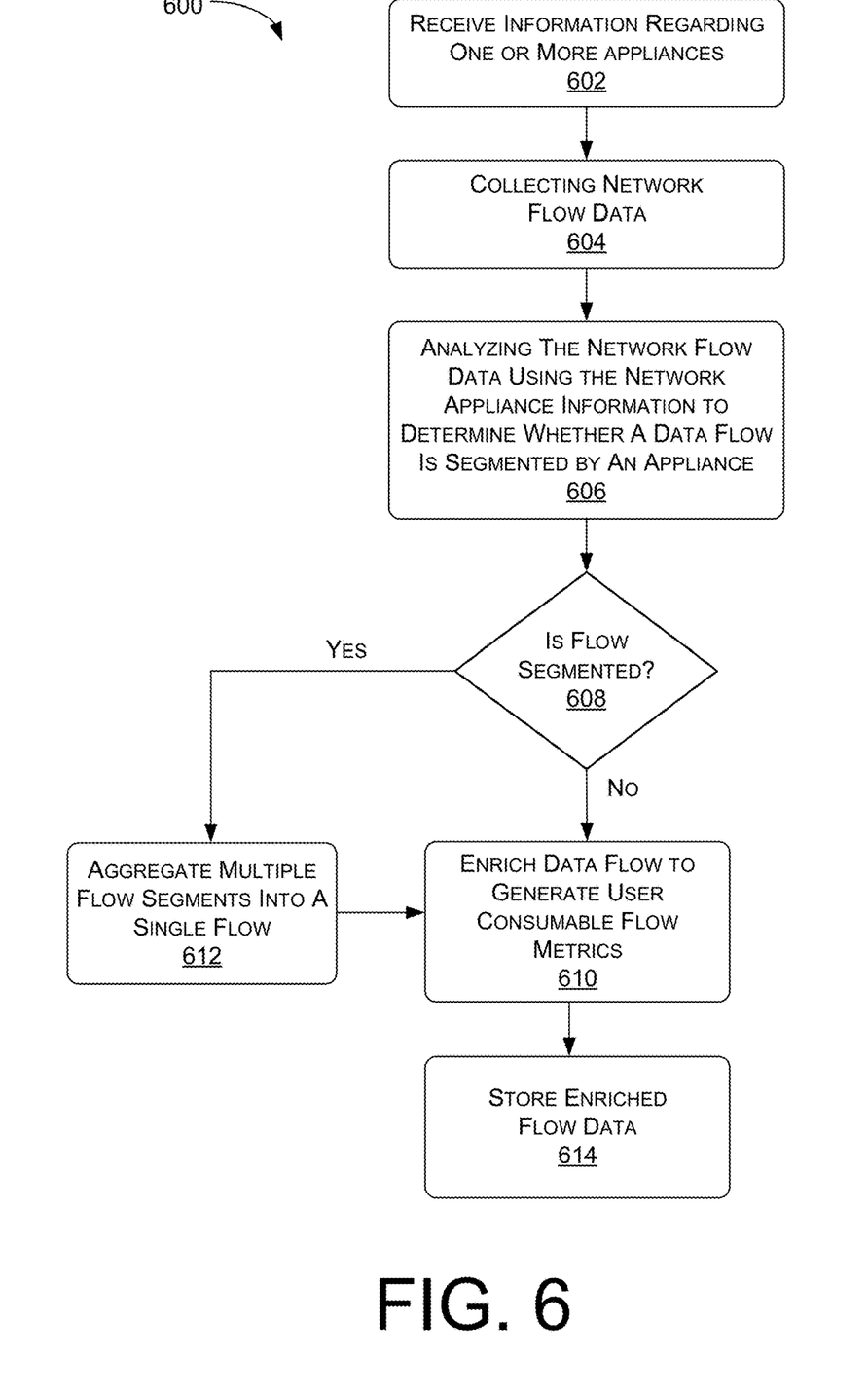
FIG. 6 illustrates a flow diagram of an example method according to another embodiment for providing end-to-end network flow metrics in a data network.

FIGS. 5 and 6 illustrate flow diagrams of example methods 500 and 600 that illustrate aspects of the functions performed at least partly by the devices in the distributed application architecture as described in FIGS. 1-4. The logical operations described herein with respect to FIGS. 5 and 6 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 5 and 6 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

FIG. 5 illustrates a flow diagram of an example of a method 500 for providing consumer usable network flow information in a network flow traversing one or more network appliances. Information regarding one or more network appliances is received 502. The information can be received from one or more devices of the network such as various network switches 104, 108 and appliances 116 (FIGS. 1-3). The information can include connection information regarding the connection of the network appliance in a network. The information can be received by a network flow collector 312 of a central ingest engine 112 and can be stored in a database 320 (FIG. 4) for future retrieval during network flow enrichment and aggregation.

Network flow data is collected 504. The network flow data can include information such a latency, packet count, network anomalies, etc. The network flow data can be collected by the flow collector 312 of a central ingest engine 112 and can include information regarding a network flow along a path including one or more network switches 104, 108 and that may or may not include one or more network appliances 116.

The network flow data is analyzed using the network appliance data to determine that the network flow is a continuous flow 506. The analysis of the network flow data can be performed by an enrichment agent 318 of the flow collector 312 which can analyze raw network flow data to enrich the data to provide consumer usable information. If the network flow includes a path that includes one or more network appliances 116, such as a firewall, load balancer or other network appliance, the analysis can be performed in view of the stored network appliance information to determine that the network flow path is actually a single network flow, and multiple network flows across the network path can be stitched together to form a continuous flow path which can be enriched to provide useful, user consumable network flow information. The analysis of the network flow data can be performed by software such as through the use of a Central Processing Unit (CPU) and in some embodiments can be performed by implementing hardware such as Application Specific Integrated Circuit (ASIC) hardware.

The network flow data can then be aggregated to provide end to end network flow information 508. The network flow aggregation can be performed by the flow aggregator 314 of the central ingest engine 112 (FIG. 4). The aggregation may include an aggregation of multiple enriched network flows which, in one embodiment can include summing, averaging and calculating a standard deviation of the multiple network flows.

FIG. 6 illustrates a flow diagram of an example of a method 600 according to another embodiment for providing consumer usable network flow information in a network flow traversing one or more network appliances. Information regarding one or more appliances such as appliances 116 in a computer network 100 is received 602. The information regarding the one or more appliances can be received by a flow collector 312 of a central ingest engine 112 (FIG. 4). The information regarding the one or more appliances 116 can include information regarding connection points in the network 100 and may include other information regarding the network appliance 116, such as, but not limited to the type of appliance, manufacturer, and may include information regarding whether the network appliance performs Network Address Translation. In one embodiment, the information regarding one or more appliances may be stored in a database for later retrieval, such as in a database 320 within the flow collector module 312 of the central ingest engine 112.

Network flow data is collected 604. In one embodiment, the network flow data can be collected by the flow collector 312 of the central ingest engine 112. The network flow data can include network flow data received from one or more service nodes such as switches 104, 108 and may also include flow telemetry packet data.

An analysis of the network flow data is performed using the received network appliance information to determine whether the data flow is segmented by the presence of one or more network appliances 606. A decision is then performed as to whether the flow is segmented by network appliances 608. If no, the flow not segmented, then the network flow data is enriched to provide consumer usable data flow information. If yes, the flow is segmented because of passing through one or more network appliance, then the data flow is aggregated or stitched together into a single flow 612. After the flow segments have been stitched together, the network flow data is enriched to provide user consumable data flow information 610. Stitching together of the data flow segments as well as the enrichment of network flow data can be performed by the enrichment agent 318 of the flow collector. The enriched data flow information is then stored 614. The enriched data flow information can be installed in a database 316 of the central ingest engine.

Figure 7:
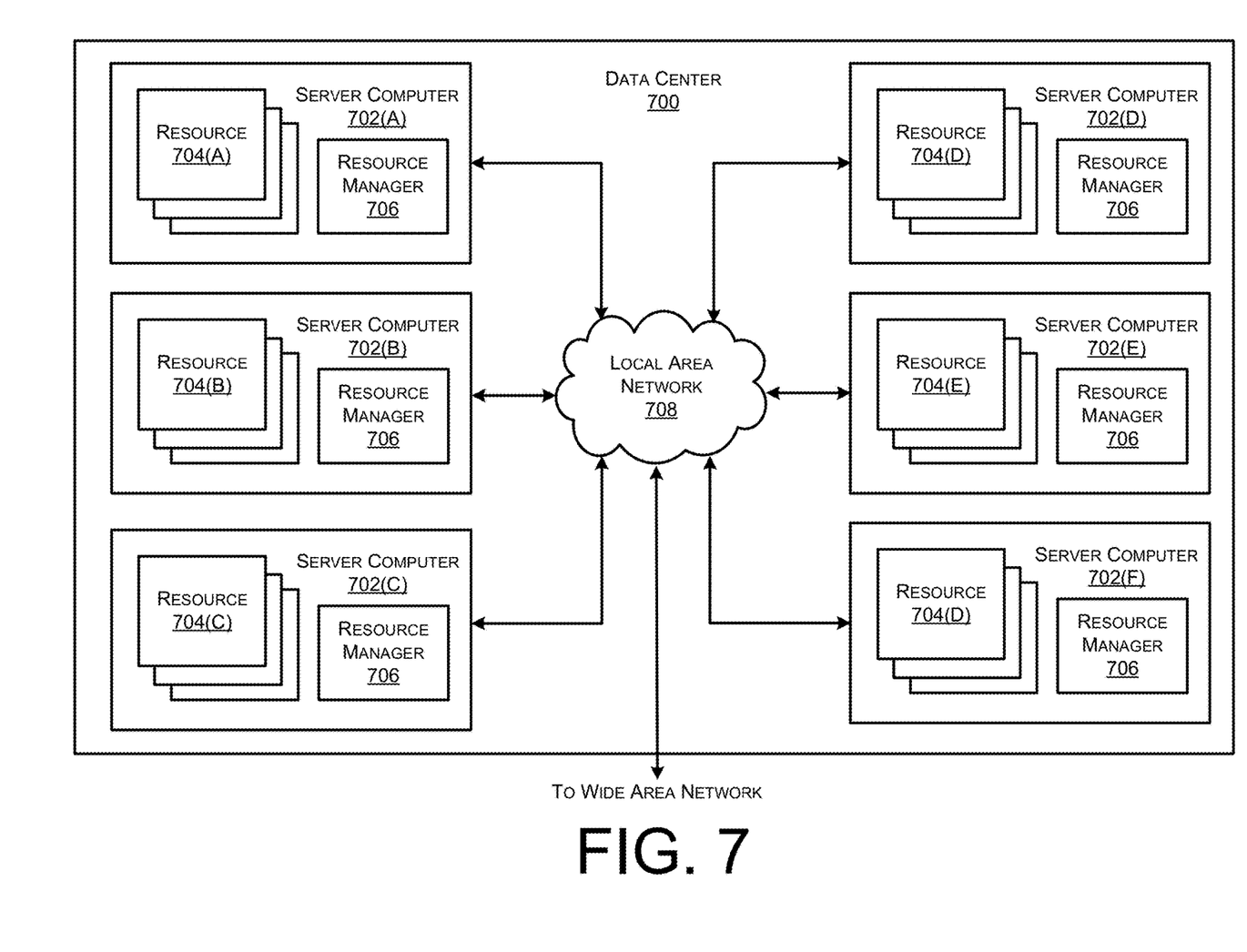
FIG. 7 illustrates a computing system diagram illustrating a configuration for a data center that can be utilized to implement aspects of the technologies disclosed herein.

FIG. 7 illustrates a computing system diagram illustrating a configuration for a data center 700 that can be utilized to implement aspects of the technologies disclosed herein. In one embodiment, the data center 700 can correspond to all or a portion of the network 100 of FIG. 1, or network 200 of FIG. 2. The example data center 700 shown in FIG. 7 includes several server computers 702A-702F (which might be referred to herein singularly as "a server computer 702" or in the plural as "the server computers 702") for providing computing resources. In some examples, the resources and/or server computers 702 may include, or correspond to, the any type of networked device described herein, such as the devices 102 of FIGS. 1 and 2. Although described as servers, the server computers 702 may comprise any type of networked device, such as servers, switches, routers, hubs, bridges, gateways, modems, repeaters, access points, etc.

The server computers 702 can be standard tower, rack-mount, or blade server computers configured appropriately for providing computing resources. In some examples, the server computers 702 may provide computing resources 704 including data processing resources such as VM instances or hardware computing systems, database clusters, computing clusters, storage clusters, data storage resources, database resources, networking resources, VPNs, and others. Some of the servers 702 can also be configured to execute a resource manager 706 capable of instantiating and/or managing the computing resources. In the case of VM instances, for example, the resource manager 706 can be a hypervisor or another type of program configured to enable the execution of multiple VM instances on a single server computer 702. Server computers 702 in the data center 700 can also be configured to provide network services and other types of services.

In the example data center 700 shown in FIG. 7, an appropriate LAN 708 is also utilized to interconnect the server computers 702A-702F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers 700, between each of the server computers 702A-702F in each data center 700, and, potentially, between computing resources in each of the server computers 702. It should be appreciated that the configuration of the data center 700 described with reference to FIG. 7 is merely illustrative and that other implementations can be utilized.

In some examples, the server computers 702 and or the resources 704 may each execute/host one or more tenant containers and/or virtual machines to perform techniques described herein. In some instances, the data center 700 may provide computing resources, like tenant containers, VM instances, VPN instances, and storage, on a permanent or an as-needed basis. Among other types of functionality, the computing resources provided by a cloud computing network may be utilized to implement the various services and techniques described above. The computing resources 704 provided by the cloud computing network can include various types of computing resources, such as data processing resources like tenant containers and VM instances, data storage resources, networking resources, data communication resources, network services, VPN instances, and the like.

Each type of computing resource 704 provided by the cloud computing network can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The cloud computing network can also be configured to provide other types of computing resources 704 not mentioned specifically herein.

The computing resources 704 provided by a cloud computing network may be enabled in one embodiment by one or more data centers 700 (which might be referred to herein singularly as "a data center 700" or in the plural as "the data centers 700"). The data centers 700 are facilities utilized to house and operate computer systems and associated components. The data centers 700 typically include redundant and backup power, communications, cooling, and security systems. The data centers 700 can also be located in geographically disparate locations. One illustrative embodiment for a device that can be utilized to implement the technologies disclosed herein will be described below with regard to FIG. 8.

Figure 8:
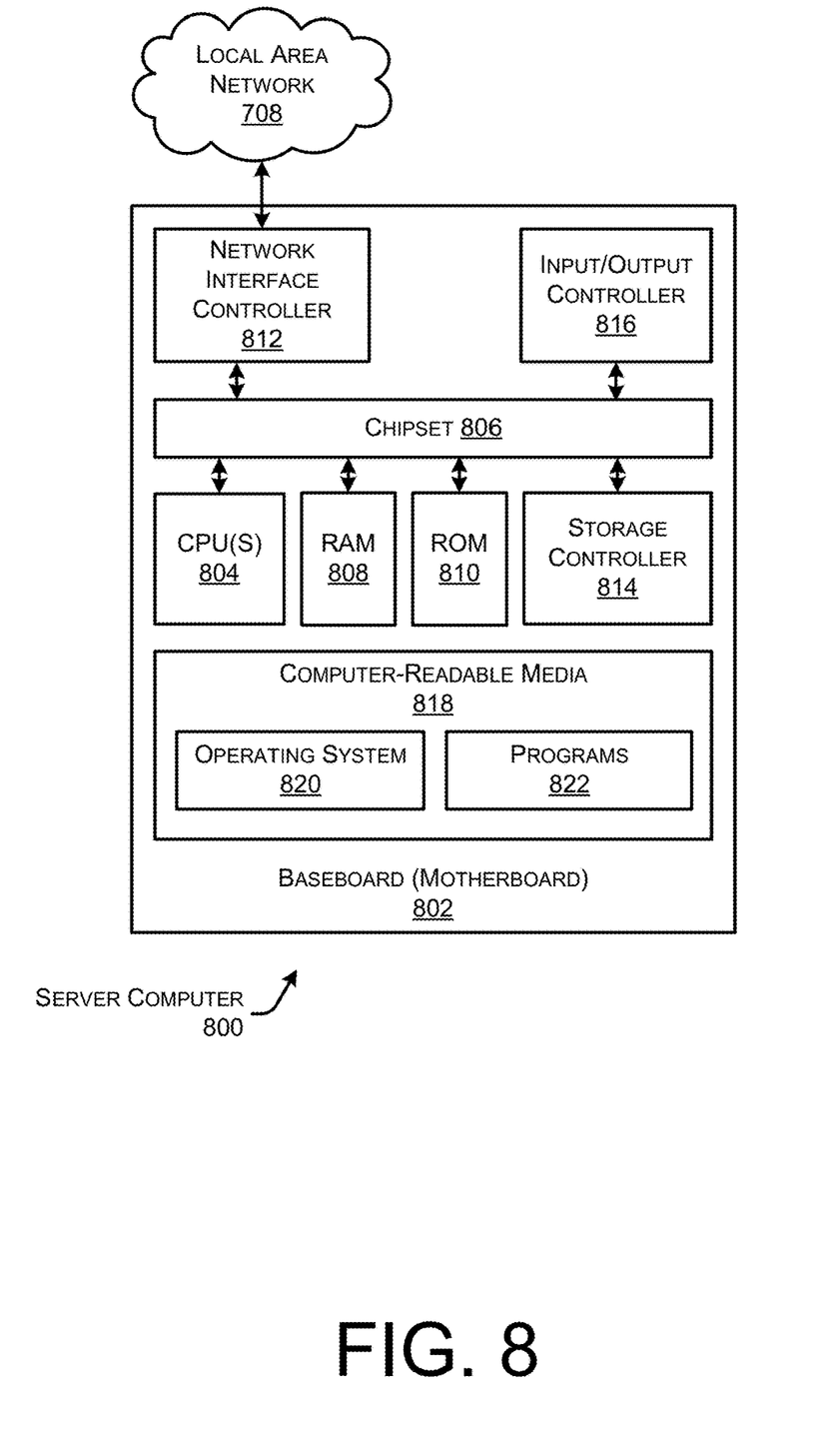
FIG. 8 illustrates a computer architecture diagram showing an example computer hardware architecture for implementing a computing device that can be utilized to implement aspects of the various technologies presented herein.

FIG. 8 illustrates a computer architecture diagram showing an example computer hardware architecture 800 for implementing a computing device that can be utilized to implement aspects of the various technologies presented herein. The computer hardware architecture 800 may be a conventional server computer, computing resource, network device (e.g., router, load balancer, data store, etc.), workstation, desktop computer, laptop, tablet, network appliance, e-reader, smartphone, or other computing device, and can be utilized to execute any of the software components presented herein. The computer 800 may, in some examples, correspond to at least one of a server 116, a blade server/component 116, a switch 114/208/308, and/or a system of computers 800 may make up the cloud management platform 106. The computer 800 may comprise networked devices such as servers, switches, routers, hubs, bridges, gateways, modems, repeaters, access points, etc.

In some embodiments, the computer 800 can correspond with devices 102 of FIGS. 1 and 2. In some embodiments, the computer 800 can correspond with routers or switches 104, 108 or network appliance devices 116 of FIGS. 1 and 2. In some embodiments, the computer 800 can be used to house or implement a central ingest engine 112 such as shown and described with reference to FIGS. 1-4. In some embodiments, the computer 800 can be used to implement method 500 of FIG. 5 or method 600 of FIG. 6.

The computer 800 includes a baseboard 802, or "motherboard," which is a printed circuit board to which a multitude of components or devices can be connected by way of a system bus or other electrical communication paths. In one illustrative configuration, one or more central processing units ("CPUs") 804 operate in conjunction with a chipset 806. The CPUs 804 can be standard programmable processors that perform arithmetic and logical operations necessary for the operation of the computer 800.

The CPUs 804 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 806 provides an interface between the CPUs 804 and the remainder of the components and devices on the baseboard 802. The chipset 806 can provide an interface to a RAM 808, used as the main memory in the computer 800. The chipset 806 can further provide an interface to a computer-readable storage medium such as a read-only memory ("ROM") 810 or non-volatile RAM ("NVRAM") for storing basic routines that help to startup the computer 800 and to transfer information between the various components and devices. The ROM 810 or NVRAM can also store other software components necessary for the operation of the computer 800 in accordance with the configurations described herein.

The computer 800 can operate in a networked environment using logical connections to remote computing devices and computer systems through a network, such as the network 126. The chipset 806 can include functionality for providing network connectivity through a Network Interface Controller (NIC) 812, such as a gigabit Ethernet adapter. The NIC 812 is capable of connecting the computer 800 to other computing devices over the network 126. It should be appreciated that multiple NICs 812 can be present in the computer 800, connecting the computer to other types of networks and remote computer systems. In some examples, the NIC 812 may be configured to perform at least some of the techniques described herein, such as packet redirects and/or other techniques described herein.

The computer 800 can be connected to a storage device 818 that provides non-volatile storage for the computer. The storage device 818 can store an operating system 820, programs 822, and data, which have been described in greater detail herein. The storage device 818 can be connected to the computer 800 through a storage controller 814 connected to the chipset 806. The storage device 818 can consist of one or more physical storage units. The storage controller 814 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 800 can store data on the storage device 818 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 818 is characterized as primary or secondary storage, and the like.

For example, the computer 800 can store information to the storage device 818 by issuing instructions through the storage controller 814 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 800 can further read information from the storage device 818 by detecting the physical states or characteristics of one or more particular locations within the physical storage units.

In addition to the mass storage device 818 described above, the computer 800 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 800. In some examples, the operations performed by any components or devices described, may be supported by one or more devices similar to computer 800. Stated otherwise, some or all of the operations performed by any components included therein, may be performed by one or more computer devices 800 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 818 can store an operating system 820 utilized to control the operation of the computer 800. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 818 can store other system or application programs and data utilized by the computer 800.

In one embodiment, the storage device 818 or other computer-readable storage media is encoded with computer-executable instructions which, when loaded into the computer 800, transform the computer from a general-purpose computing system into a special-purpose computer capable of implementing the embodiments described herein. These computer-executable instructions transform the computer 800 by specifying how the CPUs 804 transition between states, as described above. According to one embodiment, the computer 800 has access to computer-readable storage media storing computer-executable instructions which, when executed by the computer 800, perform the various processes described above with regard to FIGS. 1-6. The computer 800 can also include computer-readable storage media having instructions stored thereupon for performing any of the other computer-implemented operations described herein.

The computer 800 can also include one or more input/output controllers 816 for receiving and processing input from a number of input devices, such as a keyboard, a mouse, a touchpad, a touch screen, an electronic stylus, or other type of input device. Similarly, an input/output controller 816 can provide output to a display, such as a computer monitor, a flat-panel display, a digital projector, a printer, or other type of output device. It will be appreciated that the computer 800 might not include all of the components shown in FIG. 8, can include other components that are not explicitly shown in FIG. 8, or might utilize an architecture completely different than that shown in FIG. 8.

As described herein, the computer 800 may comprise one or more of a server 116, a switch (any described herein), or a system of devices that make up the cloud management platform 106 or a network device (e.g., server computer, computing resource, etc.). The computer 800 may include one or more hardware processors 804 (processors) configured to execute one or more stored instructions. The processor(s) 804 may comprise one or more cores. Further, the computer 800 may include one or more network interfaces configured to provide communications between the computer 800 and other devices, such as the communications described herein as being performed by the client devices 106 and computing resources 114 The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method for aggregating and enriching network flows, the method comprising:
   receiving, by a central ingest engine and at a first time, from one or more network appliances of a computer network, appliance information regarding the one or more network appliances;
   collecting, by the central ingest engine and at a second time, network flow data from one or more nodes of the computer network, the network flow data being initiated by a user device or a server device;
   determining, by the central ingest engine and based on the network flow data and the appliance information, that a network flow is segmented into a first flow segment and a second flow segment by a network appliance of the one or more network appliances; and
   aggregating, by the central ingest engine, the network flow data of the first flow segment and the second flow segment to form a continuous flow of the network flow and provide end to end network flow information.

2. The method of claim 1, further comprising enriching the network flow data to provide user consumable flow metrics.

3. The method of claim 2, further comprising storing the enriched network flow data in a database.

4. The method of claim 1, wherein the network flow data is received from one or more switches of the network, the method further comprising aggregating the network flow data from the one or more switches and the appliance information.

5. The method of claim 1, wherein the one or more network appliances include one or more of a firewall, load balancer, intrusion detection system, TCP optimizer, and a router.

6. The method of claim 1, wherein at least one of the one or more network appliances performs a network address translation, and wherein network translation address mapping is used to aggregate multiple correlated flow segments into the continuous flow.

7. The method of claim 2, wherein the enriching of the network flow data provides information regarding one or more of data packet count, data flow anomalies, and latency.

8. A central ingest engine of a computer network, the central ingest engine comprising:
one or more processors; and
one or more non-transitory computer-readable media storing instructions that, when executed by the one or more processors, cause the one or more processors to perform operations comprising:
receiving, at a first time and from one or more network appliances of the computer network, appliance information regarding the one or more network appliances;
collecting, at a second time, network flow data from one or more nodes of the computer network;
determining, based on the network flow data and the appliance information, that a network flow is segmented into a first flow segment and a second flow segment by a network appliance of the one or more network appliances; and
aggregating the network flow data of the first flow segment and the second flow segment to form a continuous flow of the network flow and provide end to end network flow information.

9. The central ingest engine of claim 8, further comprising enriching the network flow data to provide user consumable flow metrics.

10. The central ingest engine of claim 9, further comprising storing the enriched network flow data in a database.

11. The central ingest engine of claim 8, wherein the network flow data is received from one or more network switches, further comprising aggregating the network flow data from the one or more network switches and the appliance information.

12. The central ingest engine of claim 8, wherein the one or more network appliances include one or more of a firewall, load balancer, intrusion detection system, TCP optimizer and a router.

13. The central ingest engine of claim 8, wherein at least one of the one or more network appliances performs a network address translation, and wherein network translation address mapping is used to aggregate multiple flow segments into the continuous flow.

14. The central ingest engine of claim 9, wherein the enriching of the network flow data provides information regarding one or more of data packet count, data flow anomalies, and latency.

15. One or more non-transitory computer-readable media storing instructions that, when executed by one or more processors, cause the one or more processors to perform operations comprising:
receiving, at a first time and from one or more network appliances of a computer network, appliance information regarding the one or more network appliances;
collecting, at a second time, network flow data from one or more nodes of the computer network;
determining, based on the network flow data and the appliance information that a network flow is segmented into a first flow segment and a second flow segment by a network appliance of the one or more network appliances; and
aggregating the network flow data of the first flow segment and the second flow segment to form a continuous flow of the network flow and to provide end to end network flow information.

16. The one or more non-transitory computer-readable media of claim 15, further comprising enriching the network flow data to provide user consumable flow metrics.

17. The one or more non-transitory computer-readable media of claim 16, further comprising storing the enriched network flow data in a database.

18. The one or more non-transitory computer-readable media of claim 15, wherein the network flow data is received from one or more network switches, further comprising aggregating the network flow data from the one or more network switches and the appliance information.

19. The one or more non-transitory computer-readable media of claim 15, wherein the one or more network appliances include one or more of a firewall, load balancer, intrusion detection system, TCP optimizer and a router.

20. The one or more non-transitory computer-readable media of claim 16, wherein the enriching of the network flow data provides information regarding one or more of data packet count, data flow anomalies, and latency.

* * * * *